(12) United States Patent
Gosse et al.

(10) Patent No.: US 6,690,723 B1
(45) Date of Patent: Feb. 10, 2004

(54) DECISION-AIDED EQUALIZER

(75) Inventors: Karine Gosse, Paris (FR); Arnauld Taffin, Paris (FR); Yumin Lee, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/507,851

(22) Filed: Feb. 22, 2000

(30) Foreign Application Priority Data

Jul. 2, 1999 (EP) .......................... 99401654

(51) Int. Cl.$^7$ .......................... H03H 7/30; H03K 5/159
(52) U.S. Cl. .................................. 375/233
(58) Field of Search ................. 375/229, 230, 375/232, 233, 262, 340, 341, 346, 348, 350; 708/300, 320, 322, 323; 714/786, 792, 794, 795

(56) References Cited

U.S. PATENT DOCUMENTS

| | | | |
|---|---|---|---|
| 4,821,289 A | 4/1989 | Peile | 375/14 |
| 5,056,117 A | 10/1991 | Gitlin et al. | 375/102 |
| 5,293,401 A | 3/1994 | Serfaty | 375/13 |
| 5,809,086 A | 9/1998 | Ariyavisitakul | 375/332 |
| 6,459,728 B1 * | 10/2002 | Bar-David et al. | 375/231 |

FOREIGN PATENT DOCUMENTS

WO    WO9711544    3/1997

OTHER PUBLICATIONS

Cheung J C S et al: "Soft–Decision Feedback Equalizer for Continuous Phase Modulated Signals in Wideband Mobile Radio Channels"; IEEE Transactions on Communications, vol., 42, No. 2/03/04, Feb. 1, 1994, pp. 1628–1638.

Gu T et al.: "An Adaptive Combined DFE/RSSE Structure for Unknown Channel with Severe ISI"; Proceedings of the Global Telecommunications Conference (Globecom), vol. –, 1993, p. 97–101.

Jianjun Wu et al: A New Adaptive Equalizer with Channel Estimator for Mobile Radio Communications:; IEEE Transactions on Vehicular Technology, vol. 45, No. 3, Aug. 1, 1996, p. 467–474.

Kohno et al: "Design of Automatic Equalizer Including a Decoder of Error–Correcting Codes"; IEEE Transactions on Communications, US, IEEE Inc. New York, vol. 10, No. 33, Oct. 1, 1985, pp. 1142–1146.

* cited by examiner

Primary Examiner—Betsy L. Deppe
(74) Attorney, Agent, or Firm—Kenneth A. Haas

(57) ABSTRACT

In a method for channel equalization a communications receiver receives an input data stream comprising modulation symbols. A reduced set sequence estimation algorithm produces intermediate hard decisions, based on the input data stream and on a channel reference, which are applied to a decision feedback filter in a feedback loop. Soft output sequences of emitted symbols are also produced, based on the input data stream, which are decoded, error-corrected and re-encoded. The error-corrected soft output sequences are iteratively applied to the decision feedback filter, such that a channel equalized received data stream is generated based on both the feedback soft output sequences and the intermediate hard decisions. An iterative decision-aided equalizer is also described. In this manner, errors corrected by the decoder are not re-introduced into the decision feedback filter, hereby reducing the effect of error propagation in decision-aided feedback equalizers.

11 Claims, 4 Drawing Sheets

DECISION-AIDED EQUALIZER

FIELD OF THE INVENTION

This invention relates to decision-aided equalizers for communication receivers, and more particularly to decision-aided equalizers with reduced error propagation.

BACKGROUND OF THE INVENTION

In modern communications systems employing Time Division Multiple Access such as, for example, the GSM radiotelephone system, digital information in the form of a bit stream representing voice or data is encoded by the transmitter into a series of complex phase shifted signals and is transmitted by modulating the carrier wave of the transmitter with the encoded symbols. Each symbol transmitted represents a series of bits from the data stream. For instance, eight different such symbols may be used, each symbol representing three bits of the data stream.

The transmitted symbols are received by a receiver and the symbols are reconverted into a bit stream. If the transmission and reception are free from interference and distortion, the symbols are readily convened into a bit stream representing exactly the original bit stream before its conversion into symbols by the transmitter. As a practical matter, however, transmissions are rarely distortion free. Among the distortions which occur is multipath distortion caused when the receiver receives two representation of the same transmitted signal which, because of reflections, arrive at the receiver at slightly different times. The reception of two time-skewed signals causes Intersymbol Interference (ISI), where a symbol's phase component may be distorted by the delayed arrival of an earlier transmitted symbol. Channel fading and noise can also cause difficulty in accurately receiving transmitted signals.

Both of these phenomena can significantly degrade the performance of a high-speed wireless communication system Intersymbol interference (ISI) introduced by multipath propagation is mitigated in the receiver of a communication system by means of an Equalizer. Classically, two approaches are considered for this stage: either a symbol-by-symbol decision is performed, based on a filtered received signal, or the whole received sequence is estimated, often using the so-called Viterbi algorithm implementing the Maximum Likelihood Sequence Estimator (MLSE solution).

For symbol-by-symbol decisions, the Decision Feedback Equalizer (DFE) realizes an interesting trade-off between complexity and performance. The best bit error rate (BER) performance is obtained when the DFE filters are optimized for the MMSE (Minimum Mean Square Error) criterion. However, the DFE structure suffers from the error propagation phenomenon: if an error occurs, it enhances the ISI on the following samples entering the decision device, thus causing in turn more errors.

On the other hand, sequence estimation methods give the best performance, but at the cost of increased complexity. For an eight-state symbol constellation, for example, a Viterbi calculation must calculate $8^{L-1}$ possibilities, where L is the number of taps in the channel. Thus suboptimal techniques for the MLSE were proposed:

In "Delayed Decision-Feedback Sequence Estimation" (A. Duel-Hallen, C. Heegard, IEEE Transactions on Communications, vol.37 No: 5, May 1989), the state trellis, basis for the Viterbi algorithm, only takes into account the first N taps in the channel. Then, the transition metrics are computed using past tentative decisions on each of the summing paths, In this respect, it is said that such sequence estimation incorporates a feedback, and the resulting Decision Feedback Sequence Estimation (DFSE) algorithm has a reduced number of states compared to the MLSE.

In "Reduced-State Sequence Estimation with Set Partitioning and Decision Feedback" (M. Vedat Eyuboglu, S. U. H. Quereshi, IEEE Transaction on Communications, vol.36, No. 1, January 1988), further reduction of the number of states can be achieved by introducing a partitioning of the constellation symbols. This approach is referred to as reduced state sequence estimation (RSSE). There, a "reduced" state is a vector of indexes of symbol subsets. This algorithm provides the greatest flexibility when handling Finite Impulse Response (FIR) channels and high order modulations.

The advantage of reduced state approaches is to reduce the complexity of the Viterbi-based equalizers. On the other hand, their performance can also be degraded by error propagation, even if this phenomenon is less severe than in the DFE, since the reliability of the feedback decisions is improved by the Viterbi stage. This error propagation effect is minimized when the channel to be equalized is minimum-phase. In a mobile communication context, this is usually not the case.

With a reduced state Viterbi processor, typically the input symbol stream is filtered in some manner and applied to the processor so that error propagation is reduced. Other inputs to the Viterbi processor are the estimated channel coefficients, which are usually obtained by calculating the channel parameters from a training frame of a known symbol sequence which is transmitted as a part of a preamble to the data. The calculation determines the weights to be ascribed to each of the coefficients of the preceding symbols so that the weighted effect of the preceding symbols can be subtracted from the combined signal to obtain the value of the symbol being calculated. The Viterbi processor then calculates hard outputs, which are used in the feedback path of the processor in the reduced state version.

Interleaving, and channel coding also can be used to mitigate the adverse effects of multipath and fading. A decision-aided equalizer, such as a decision-feedback equalizer (DFE), can be used as a means for mitigating the effects of ISI in a system where an interleaves and channel coder provide further protection against channel fading, residual ISI, and thermal noise.

In general, the decision-aided equalizer uses the linear combination of the past decisions to cancel post-cursor ISI, where the feedback filter (FBF) coefficients are obtained under the assumption that past decisions are correct. Consequently, errors in the past decisions enhance, instead of cancel, the ISI. The enhanced ISI may cause more decision errors in the current and future symbols, which will in turn further enhance the ISI, Thus leading again to propagation errors.

SUMMARY OF THE INVENTION

To address the shortcomings of the prior art, applicants have provided an advantageous new hybrid equalizer and and an improved method for equalizing to mitigate the effects of intersymbol interference, channel fading and noise.

A method for channel equalization in a communications receiver comprises receiving an input data stream comprising modulation symbols; and employing a reduced set sequence estimation algorithm to produce intermediate hard decisions based on the input data stream and on a channel reference. The intermediate hard decisions are applied to a decision feedback filter in a feedback loop. In addition, soft output sequences of symbols are produced based on the input data stream, which are decoded, error-corrected and re-encoded. The error-corrected soft output sequences are then applied iteratively to the decision feedback filter, in order to generate a channel equalized received data stream based on both the feedback soft output sequences and the intermediate hard decisions.

An iterative decision-aided equalizer comprises a decision feedback equalizer having a processor employing a reduced set sequence estimation algorithm for receiving an input data stream comprising modulation symbols, and providing intermediate hard decisions based on the input data stream and on a channel reference. A decision feedback filter is coupled to an output of the processor A summing device sums an output of the decision feedback filter with the input data stream to produce soft outputs representing the received symbols. A feedback loop receives soft outputs from the summing device and iteratively provides error-corrected soft outputs to the decision feedback filter. The feedback loop comprises a decoder for decoding and error-correcting the soft outputs and an encoder for encoding the error-corrected sequence of soft outputs. The feedback loop iteratively applies the error-corrected soft outputs to the decision feedback filter to generate a channel equalized received data stream.

DESCRIPTION OF THE PREFERRED EMBODIMENT

Figure 1:
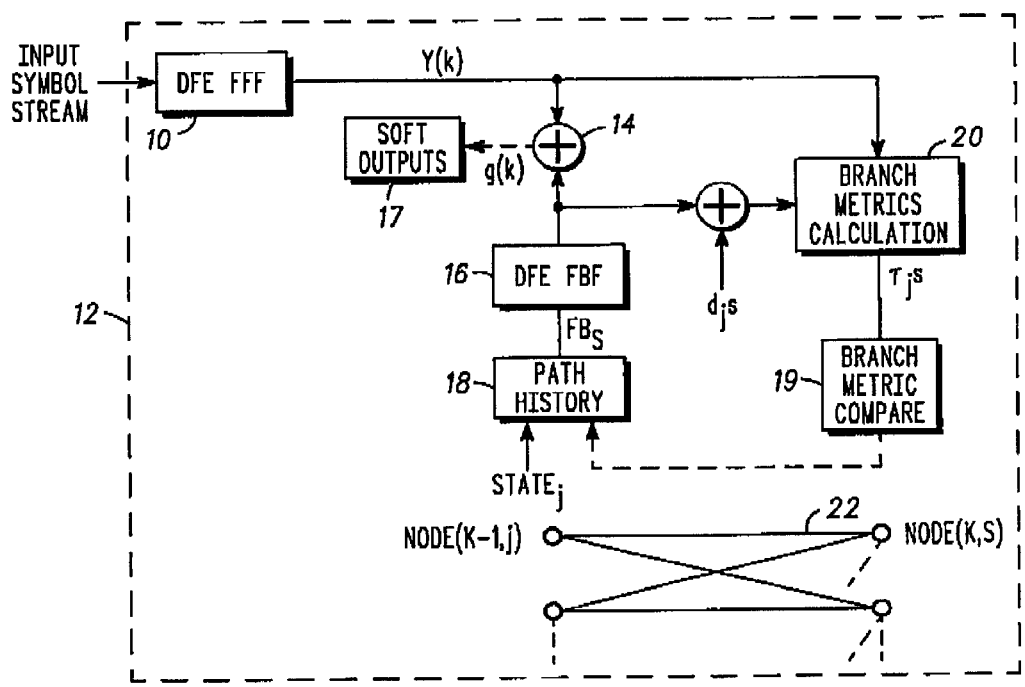
FIG. 1 is a block diagram of one aspect of the invention showing a hybrid RSSE DFE equalizer.

FIG. 1 shows a hybrid equalization scheme, based on a Minimum Mean Square Error (MMSE) Decision Feedback Equalizer (DFE), in which error propagation is mitigated by the use of a Reduced State Sequence Estimator (RSSE) algorithm as a decision device. The DFE is designed to perform symbol-by-symbol calculations, generally solving an equation of the type:

$$[Y_n = h_0 S_n + h_1 S_{n-1} + h_2 S_{n-2} \ldots]$$

Where $Y_n$ is known, $S_n$ is the symbol currently being calculated, $S_{n-1}$ is the preceding symbol, and $h_0, h_1, h_2 \ldots$ are the channel coefficients.

In a generalized representation, the input data stream is filtered by an MMSE DFE Feedforward filter, yielding $Y_k$, which is used to compute the branch metric. In the hybrid RSSE DFE algorithm, the signal constellation is first partitioned into N disjoint subsets. The number of states in the trellis is then $N^L$ where L is the size of the state vector and N the number of subsets. In a low complexity implementation, a preferred choice is L=1, and in that case, the Viterbi machine is said to be in state s if the last transmitted symbol belongs to subset s. The branch metrics associated with state transitions are computed based on the Euclidean distance between the equalized signal and coset-sliced symbols. One feedback register is maintained for every surviving path.

Mathematically, denote a node in the trellis as (k,s), where k is the time index and s is the state index, and define the following variables:

K: length of the sequence.

N: number of states in the trellis.

$S_s$, s=0,1, ... (N−1): subsets of the signal constellation, $\cup_{s=0}^{N-1} S_s$ is the signal constellation.

M(k,s), k=0,1 ... (K−1), s=0,1, ... (N−1): accumulated metric of node (k,s);

$G_{js}$: branch metric associated with the transition from node (k−1,j) to node (k,s);

$d_{js}$: coset sliced symbols associated with the transition from node (k−1,j) to node (k,s);

p(k,s): state at time (k−1) of the surviving path leading to node (k,s);

$e_s(k)$, k=0,1, ... (K−1): equalized signal associated with the surviving path leading to node (k,s).

SoftOut$_s$(k), k=0,1, ... , (K−1): soft-decisions associated with the surviving path leading to node (k,s);

HardOut$_s$(t), k=0,1, ... , (K−1): hard-decisions associated with the surviving path leading The hybrid RSSE DFE algorithm for L=1 is as follows:

For s=0, 1, ... , (N−1), M(−1,s)←0;

For s=0, 1, ... (N−1) and n=1, 2, ... $N_b$, FB$_s$(n)←0

For k=0,1, ... , (K−1), repeat:

Compute Equalized Signals: For s=0,1, ... (N−1): $e_s(k)$ ←[y(k)−$\sum_{n=1}^{N_b} b_n$HardOut$_s$(k−n)

Coset Slicing: For s=0,1, ... (N−1), j=0,1, ... (N−1): $d_{js}$←min$_{XE\ SS}|e_j(k)-x|^2$, (Note that $d_{js} \in S_s$).

Compute Branch Metric: For s=0,1, ... (N−1), j=0,1, ... (N−1): $\Gamma_{js}$←|$e_j(k)-d_{js}$|$^2$ Update Node Metric: For: s=0,1 ... (N−1): M(k,s) ←min{M(k−1,j+$\Gamma_{js}$}

Update Path History: For: s=0,1, ... (N−1): p(k,s)=arg min{M(k−1,j+$\Gamma_{js}$}

Update Hard-decision Outputs: For s=0,1, ... (N−1), repeat:

For λ=0,1, ... k−1: HardOut$_s$(λ)←HardOut$_{p(k,s)}$(λ): HardOut$_s$(k)=$d_{p(k,s)s}$.

Update Soft-decision Outputs: For s=0,1, ... (N−1), repeat:

For λ=0,1, ... t−1: SoftOut$_s$(λ)←SoftOut$_{p(k,s)}$(λ); SoftOut$_s$(k)=$e_{p(k,s)}$(k).

Update Feedback Register: For s=0,1, ... (N−1), repeat:

For n=1,2, ... (N$_b$: FB$_s$(N$_h$−n)←FB$_{p(k,s)}$(N$_b$−n); FB$_s$(1)= $d_{p(k,s)s}$.

Final Output:

$$FinalState \leftarrow \arg\min_s M(K-1, s);$$

Final hard-decision output is HardOut$_{FinalState}$(k), k=0,1, ... (K−1)

Final soft-decision output is SoftOut$_{FinalState}$(k), k=0,1, ... (K−1).

Note that the buffering of the hard-decision outputs HardOut is unnecessary if only the soft-decision outputs are to be used in subsequent processing. Although only the algorithm for L=1 is shown, it can be easily generated for any value of L.

In a preferred embodiment of FIG. 1, the Feedforward Filter 10 of the DFE is used as a prefilter for the Reduced State Sequence Estimator 12 and the channel seen by the RSSE 12 is the Finite Impulse Response (FIR) of the Feedback Filter 16 of the MMSE DFE. Recall that the channel input is usually obtained by calculating the channel parameters from a training frame of a known symbol sequence which is transmitted as a part of a preamble to the data. The advantage of using the Feedback Filter 16 as the channel representation is that soft-decision outputs in the form of a bit stream are directly generated as shown below.

The input signal $Y_k$ is applied to summing node 14, which also receives an input from the DFE Feedback Filter 16. The summing node 14 combines these signals and outputs the combined signal g(k) as symbol-level soft outputs 17 without any additional processing. As noted earlier in conventional sequence estimators such as the MLSE, DFSE, or pure RSSE the soft-decision outputs are not automatically derived in this manner, but must be separately calculated, adding to the complexity of those devices. The soft-decision outputs can greatly enhance the performance of the overall equalizer and decoder chain.

The Feedback Filter 16 derives its input from the past history of processed input signals. The past history is provided by storing in storage 18 the decision on the symbol leading to state S, based on the branch metrics comparison performed by branch metric comparator 19 using as inputs the branch metrics provided by the branch metric calculator 20 which is part of the Viterbi algorithm processor. Thus, as illustrated in the aforementioned equations, a temporary vector of a small set of (intermediate) hard decisions is stored in variable FBs, and is then fed from storage 18 to Feedback Filter 16. The filtered input signal $Y_k$ is also applied to the branch metric calculator 20 which receives another input from $d_{js}$ which is a possible value of what the symbol presently being calculated is, and which corresponds to a possible transition in the trellis. This trellis is representationally shown by 22. In the Viterbi algorithm, branch metrics are calculated for each possible predecessor state of each arrival state in the trellis. For a given arrival state $S_0$, the most likely predecessor $j_0$ is chosen, and the symbol $d_{j_0}s_0$, corresponding to the transition, is stored in the path history of state $S_0$, and in the feedback register.

Figure 2:
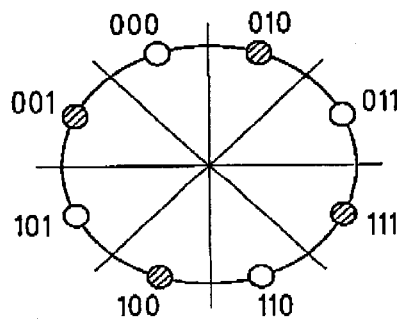
FIG. 2 is a representation of the set partitioning for the two-state RSSE DFE of a preferred embodiment of the invention for 8-PSK modulation.

The two-state RSSE of the disclosed embodiment relies on a partitioning on the symbol constellation into two subsets as described in FIG. 2. It is the lowest complexity hybrid scheme and it is a preferred embodiment of the invention. The two-state hybrid RSSE DFE was chosen because of its flexibility, superior performance, and low complexity. In this device the number of states in the trellis (2) is considerably less than the constellation size (8). As noted earlier this would not be possible for devices such as the Decision Feedback Sequence Estimator (DFSE) or the Maximum likelihood Sequence Estimator (MLSE).

In this implementation, the symbols of the constellation are partitioned into two subsets with four 8-PSK (Phase Shift Keyed) symbols each, so that the distance between symbols belonging to the sane subset is maximized. The set partitioning is shown in FIG. 2 with one set being represented by black circles and the other set by shaded circles.

Figure 3:
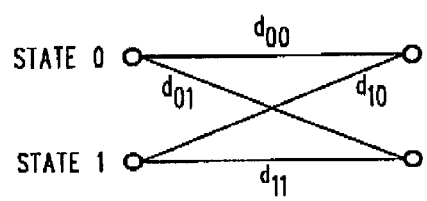
FIG. 3 is a diagram of the state trellis for the two-state RSSE DFE of a preferred embodiment of the invention.

FIG. 3 is a diagram of the state trellis for the two-state RSSE DFE of a preferred embodiment of the invention, the function of which is described above. The state trellis of FIG. 3 shows the source and destination nodes of each of the possible signal paths in a two-state trellis.

Coset slicing in this implementation is done by first determining the closest 8-PSK symbol, d, to the equalized signal $e_s(t)$. Then the algebraic sign of the quantity:

Phase Diff=Im[$d \times$ SoftOut$_s^*(t)$]

Is computed. A look-up table, shown in Table 1, is then used to determine the coset sliced symbols $d_{s0}$ and $d_{s1}$.

| 8-PSK symbol | 0 | 0 | 0 | 0 | 1 | 1 | 1 | 1 |
|---|---|---|---|---|---|---|---|---|
|  | 0 | 0 | 1 | 1 | 0 | 0 | 1 | 1 |
|  | 0 | 1 | 0 | 1 | 0 | 1 | 0 | 1 |
| Subset | 0 | 1 | 1 | 0 | 1 | 0 | 0 | 1 |
| Nearest Symbol (Phase diff > 0) | 2 | 0 | 3 | 7 | 5 | 1 | 4 | 6 |
| Nearest Symbol (Phase diff < 0) | 1 | 5 | 0 | 2 | 6 | 4 | 7 | 3 |

Figure 4:
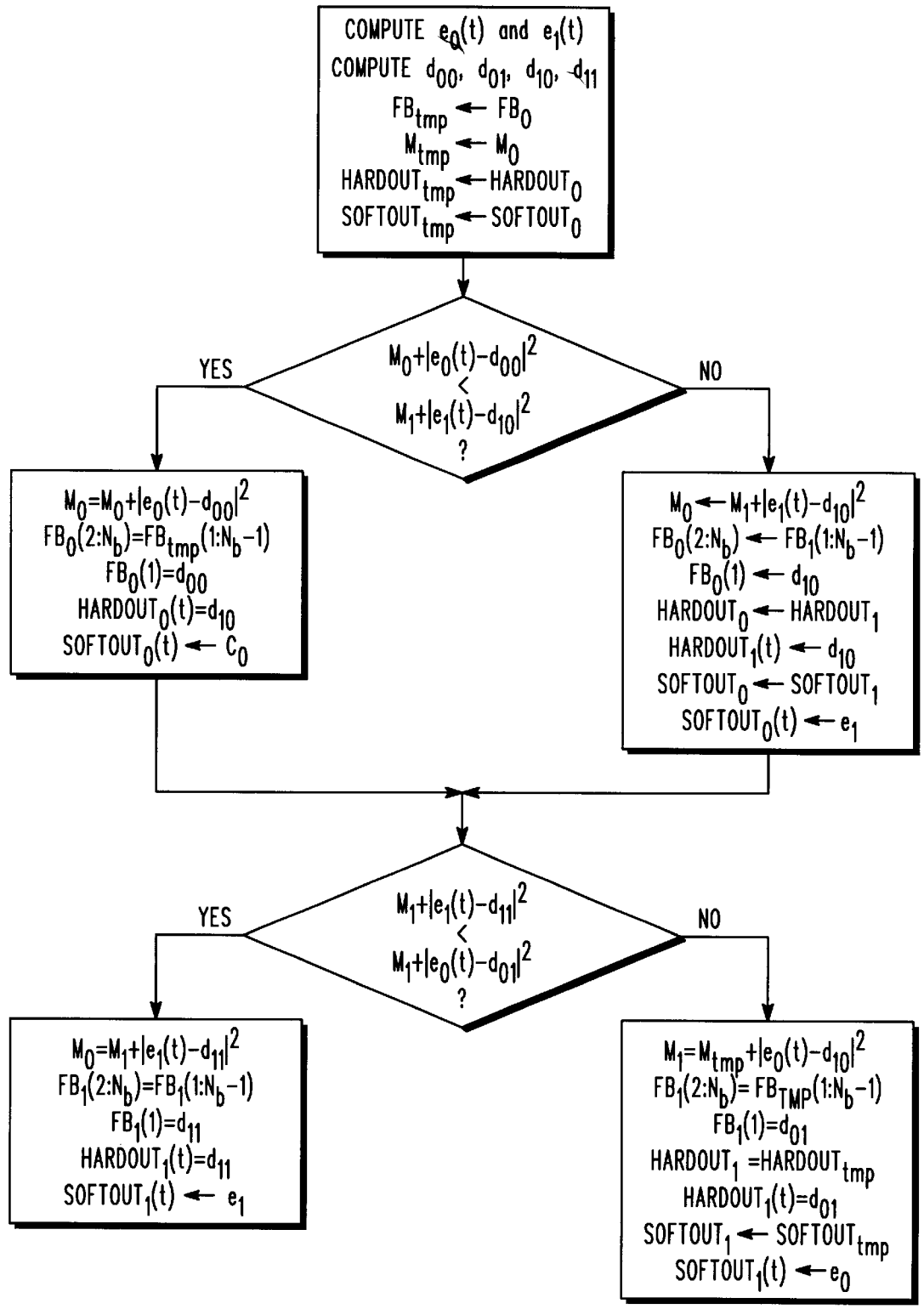
FIG. 4 is a flow chart of the core part of the two-state hybrid RSSE DFE equalizer of the invention.

FIG. 4 is a flow chart of the core part of the two-state hybrid RSSE DFE equalizer of the invention. This represents the specific case of the generalized algorithm presented above.

The improvement obtained results from the close integration of DFE and RSSE: improvement of the DFE by introducing an RSSE "decision device", but in turn improvement of the RSSE by using the DFE filters as prefilter and equivalent channel. An advantage of using RSSE is to have the flexibility to design very low cost receivers, in which the number of states in the Viterbi algorithm is smaller than the signal constellation size.

As a further improvement, there is shown a new method and apparatus for mitigating the effect of error propagation in decision-aided equalizers such as the DFE. In this method, equalization is performed iteratively, and hard information is fed back from the channel decoder to the equalizer to reduce error propagation. The iterative approach of the invention applies to any decision-aided equalizer for reducing the error propagation effect in a receiver. In this approach, the processing is done on a block-by-block basis, one iteration estimating a whole block of emitted symbols.

Figure 5:
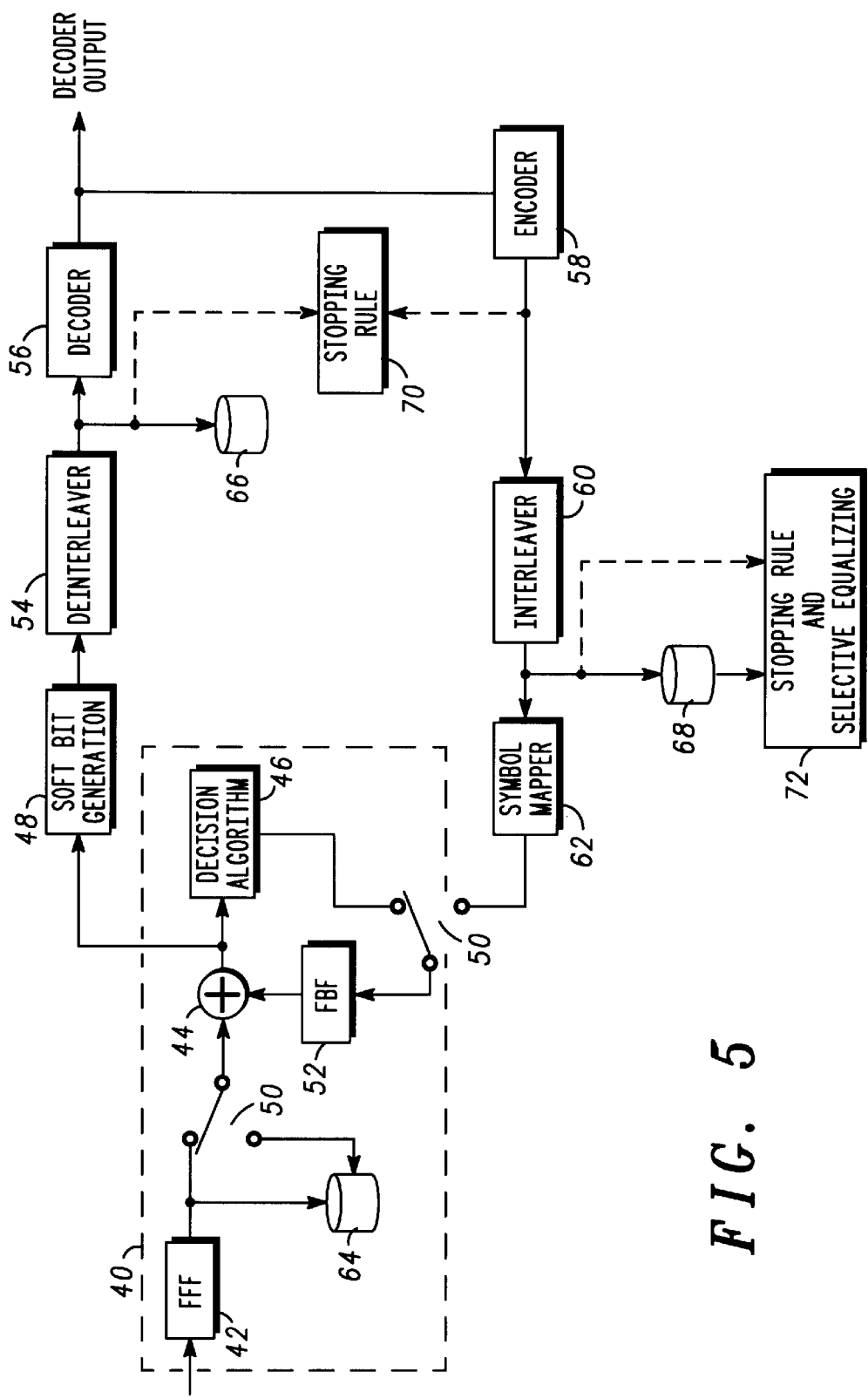
FIG. 5 is a block diagram of an iterative equalizer, the second aspect of the invention.

FIG. 5 shows a block diagram of the iterative equalizer. A received signal, which may be interleaved and convolutionally coded, is applied to the Feed Forward Filter 42 of a Decision Feedback Equalizer 40. The output of the Feed Forward Filter 42 is applied to a summing node 44, the output of which is applied to a processor 46, which may be a Viterbi processor or any other kind of processor for sequence estimation, and to a Soft Bit Generator 48. The output of the processor is applied through a switch 50 to the Feedback Filter 52 of the decision Feedback equalizer. The output symbols of the Feedback Filter 52 are one of the inputs to the summing node 44. The hybrid equalizer of FIG. 1 is a possible embodiment for this stage, but other solutions exist, such as a plain DFE. The output bits of the Soft Bit Generator 48 are deinterleaved by Deinterleaver 54, the output of which is decoded by Channel Decoder 56, which may be a convolutional decoder, to provide a decoded output signal representing the received sequence corrected for errors as a result of noise or residual Intersymbol Interference (ISI).

Thus, in the first iterative cycle, the decision Feedback equalizer 40 functions in a conventional way in estimating the entire sequence. In every subsequent iteration, however, switch 50 is moved to its alternate position to disconnect the Feedback Filter 52 from the processor 46, and to remove the incoming data stream from the summing node 44 and a new signal is applied to the Feedback Filter 52.

The new signal is produced by taking the decoded output signal, re-encoding the signal in Encoder 58, the output of which is applied to Interleaver 60 to be reinterleaved and then coupled through Symbol Mapper 62 and Switch 50 to Feedback Filter 52. Symbol Mapper 62 is used to return the bit stream to a symbol stream to be compared to the originally received symbol stream from buffer 64.

This technique relies on the fact that the reencoded sequence contains fewer errors because of the decoder's error correcting ability. The errors corrected in the decoder are not reintroduced into the Feedback Filter 52, thus reducing the effect of error propagation.

Mechanisms for convergence control and selective requalization are also implemented, as will be discussed later. It should be noted that buffers are necessary to store the outputs of the Feedforward Filter 42, the soft inputs to the Channel Decoder 56, and the outputs of the interleaver 60. These are stored respectively in Buffers 64, 66, and 68. A Buffer (not shown) may also be necessary to store the coefficients of the Feedback Filter 52 if the coded symbols are interleaved over bursts with different channel characteristics. The output of Feedforward Filter 42 is saved in buffer 64 to provide a copy of the original data stream for use in subsequent iterations of the equalizer.

Following the deinterleaving of the Soft Bits by the Deinterleaver 54, and following the re-encoding of the decoded output by Encoder 58, a test is made for convergence to determine whether the iterative process should stop or continue, thus eliminating unnecessary iteration. The first test is made by Stopping Rule 70, which is:

At iteration i, if the output of the channel re-encoder differs from the hard input (the sign bit of the soft input) of the Channel Decoder 56 by less than $\theta_{low}$ or more than $\theta_{high}$ bits, the iteration is stopped. Otherwise perform interleaving and check Rule 72. Theta is determined experimentally and in general, different values are necessary for different codes and different maximum numbers of iterations.

Stopping rule 72 is:

Stop the iteration if no re-equalization is necessary. Re-equalization of a burst is necessary if and only if the interleaver output at iteration i is different from that of iteration i−1.

Stopping Rule 70 uses the number of different bits between the re-encoded sequence and the de-interleaved hard decision received sequence as a measure of channel quality. If there are many different bits, then the channel is probably very poor, and further iterations are useless. If there are only a few different bits, then the channel is probably very good, and further iterations are unnecessary.

Stopping Rule 72 monitors the change in the re-encoded sequence from one iteration to the next. If there is no change, no further iteration is necessary because further error correction is impossible.

A further reduction in complexity and processing time is achieved by selective re-equalization of the received signal. In conjunction with the test of Stopping Rule 72, a new iteration will begin if the Interleaver 60 output at iteration i is different from that of iteration i−1. If there is a difference, the location of the differences is noted and only the bits or symbols associated with the affected location (plus any adjacent locations that may be affected, depending on the length of the Feedback Filter 52) are used as the next input for the decision feedback alter in the re-equalization process.

Figure 6:
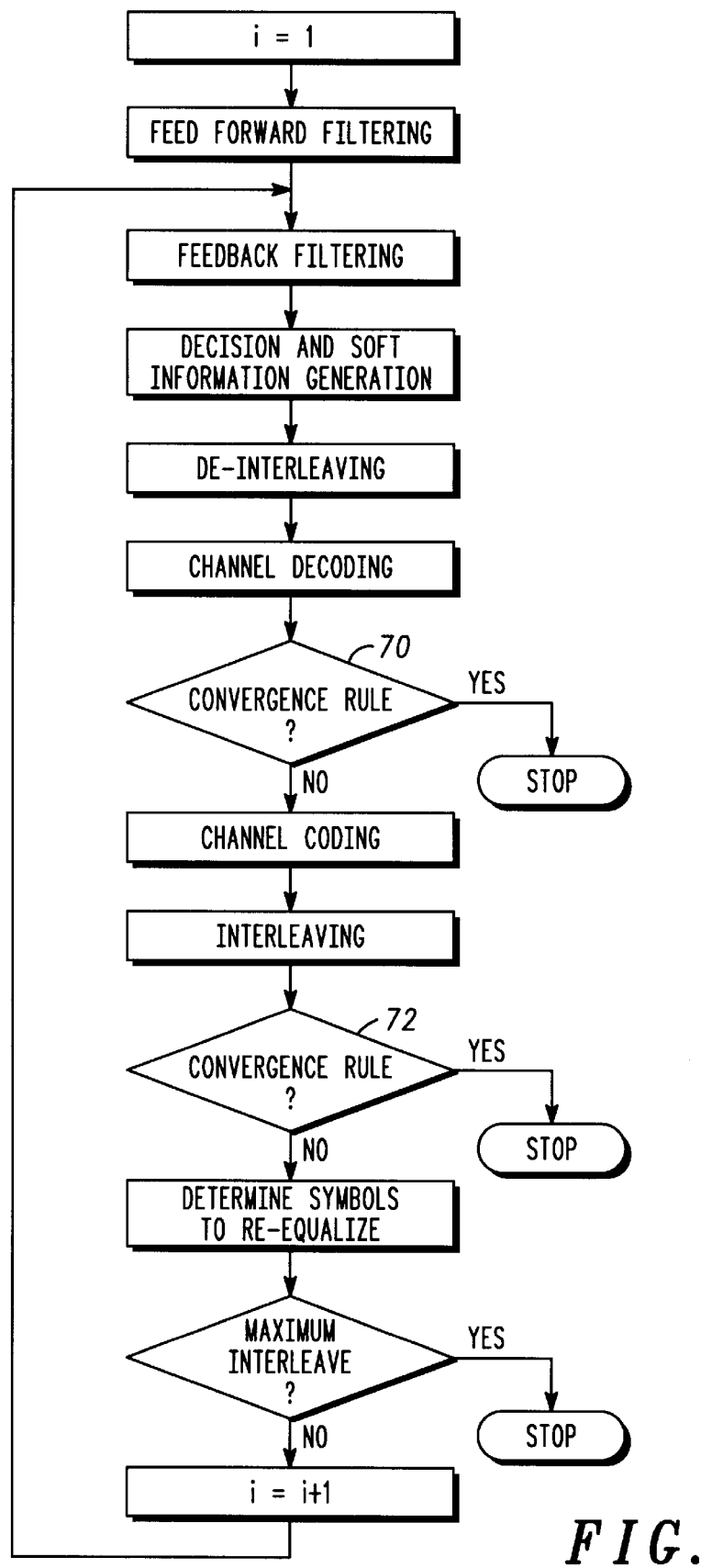
FIG. 6 is a flow chart showing the operation of the iterative equalizer of FIG. 5.

FIG. 6 is a flow chart showing the operation of this embodiment of the invention as set out above, and it clarifies the operation of Stop Rules 70 and 72. This flow chart represents the operation of the device as described above and is self-explanatory when viewed with the above description.

What is claimed is:

1. A method for channel equalization in a communications receiver comprising:
   receiving an input data stream comprising modulation symbols;
   employing a reduced set sequence estimation algorithm to produce intermediate hard decisions based on the input data stream and on a channel reference;
   applying the intermediate hard decisions into a decision feedback filter in a feedback loop,
   producing soft output sequences of symbols based on the input data stream;
   decoding and error-correcting the soft output sequences re-encoding the error-corrected soft output sequences;
   applying the re-encoded error-corrected soft output sequences iteratively into the decision feedback filter; and
   generating a channel equalized received data stream based on both the re-encoded error-corrected soft output sequences and the intermediate hard decisions.

2. The method as set forth in claim 1 further comprising the step of:
   summing an output of the decision feedback filter with the input data stream to produce a symbol stream representing the received symbols for use in the reduced set sequence estimation algorithm and to produce the soft output sequences of symbols.

3. The method as set forth in claim 1 further comprising the steps of:
   de-interleaving soft output bits for decoding; and
   re-interleaving the re-encoded error-corrected soft output sequences for applying to the decision feedback filter.

4. The method as set forth in claim 3 further comprising the step of:
   re-mapping the re-interleaved sequence into symbols and applying the remapped symbols iteratively to the decision feedback filter.

5. The method as set forth in claim 1 further comprising the step of controlling a number of iterations of applying the re-encoded error-corrected soft output sequences to the decision feedback filter.

6. The method as set forth in claim 5 further comprising the step of:
   determining a difference between interleaver outputs of successive iterations and
   selectively controlling bits or symbols that are fed back to the decision feedback filter in response to the determined difference.

7. An iterative decision-aided equalizer comprising:
   a decision feedback equalizer having:
      a processor employing a reduced set sequence estimation algorithm for receiving an input data stream comprising modulation symbols, and providing intermediate hard decisions based on the input data stream and on a channel reference;
      a decision feedback filter coupled to an output of the processor; and a summing device for summing an output of the decision feedback filter with the input data stream to produce soft outputs representing the received symbols;

a feedback loop, for receiving soft outputs from the summing device and iteratively providing error-corrected soft outputs to the decision feedback filter, comprising:

a decoder for decoding and error-correcting the soft outputs;

an encoder for encoding the error-corrected sequence of soft outputs, wherein the feedback loop iteratively applies the encoded error-corrected soft outputs to the decision feedback filter to generate a channel equalized received data stream.

8. The iterative decision-aided equalizer as set forth in claim 7, wherein the feedback loop further comprises:

a soft-bit generator for receiving the soft output received symbols from the decision feedback equalizer and generating soft output bits;

a de-interleaver for de-interleaving the soft outputs for input to the decoder; and a re-interleaver for re-interleaving the encoded error-corrected soft outputs.

9. The iterative decision-aided equalizer as set forth in claim 8, further comprises:

a bit re-mapper for re-mapping the re-interleaved encoded error-corrected soft outputs into symbols and applying the re-mapped symbols iteratively to the decision feedback filter.

10. The iterative decision-aided equalizer as set forth in claim 7 further comprising means for controlling a number of iterations of iteratively providing encoded error-corrected soft outputs to the decision feedback filter of the iterative decision-aided equalizer.

11. The iterative decision-aided equalizer as set forth in claim 10, wherein the means for controlling a number of iterations further comprises means for determining a difference between interleaver outputs of successive iterations and selectively controlling the number of iterations based on the determined difference.

* * * * *